May 31, 1932.   H. D. JAMES   1,860,504
DYNAMIC BRAKE FOR AUTOMOBILES
Filed April 16, 1928
Fig.1.
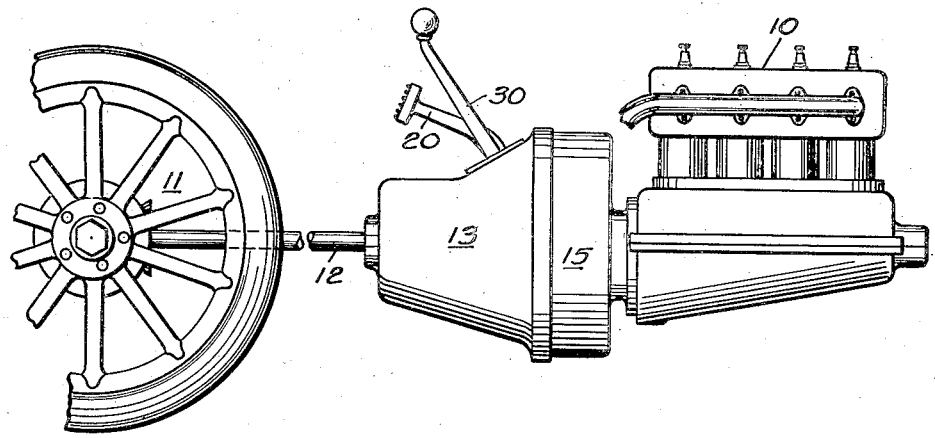
Fig.2.
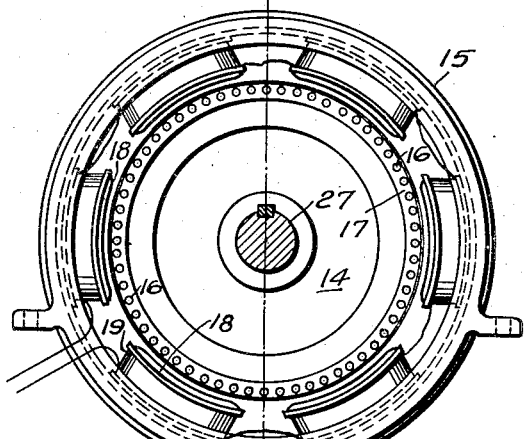
Fig.3.
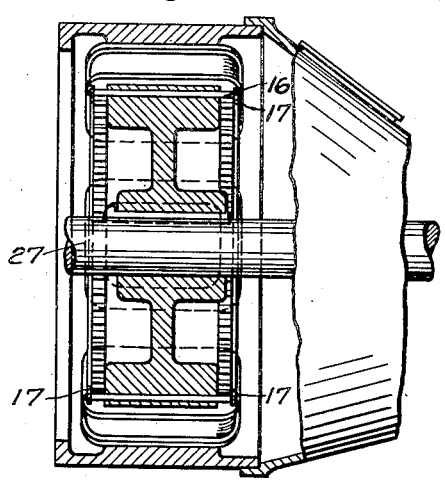
Fig.4.
Fig.5.
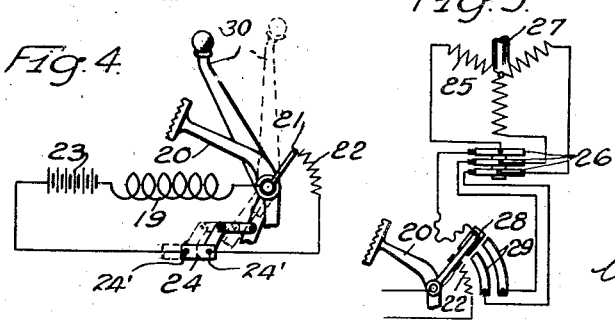
INVENTOR
Henry D. James.
BY
ATTORNEY Patented May 31, 1932

1,860,504

UNITED STATES PATENT OFFICE

HENRY D. JAMES, OF SWISSVALE, PENNSYLVANIA, ASSIGNOR TO WESTINGHOUSE ELECTRIC & MANUFACTURING COMPANY, A CORPORATION OF PENNSYLVANIA

DYNAMIC BRAKE FOR AUTOMOBILES

Application filed April 16, 1928. Serial No. 270,264.

This invention relates generally to automobiles and particularly to means for electro-dynamically braking the engines of automobiles to retard the speed.

The object of my invention, generally stated, is to provide for electro-dynamically braking an automobile to control its speed.

A further object of my invention is to provide a method of increasing the electro-dynamic braking effect on an automobile as a mechanical brake is applied and removing the electro-dynamic braking effect in response to the disengagement of the clutch when the automobile has been slowed down to a low speed.

Further objects of my invention will become apparent to those skilled in the art when the following description is read in conjunction with the accompanying drawings, in which:

Figure 1 is a view, in side elevation, of an engine and transmitting mechanism for an automobile.

Fig. 2 is an end view of a fly wheel of an automobile encircled by a plurality of electromagnets arranged to provide a field winding similar to that of an electric motor.

Fig. 3 is a sectional view of the fly wheel and field winding shown in Fig. 2,

Fig. 4 is a diagrammatic view of a circuit for energizing the electro-magnetic field winding surrounding the fly wheel of an automobile, and Fig. 5 is a diagrammatic view of a modification of my invention, in which a winding corresponding to a wound-rotor induction motor is provided on the fly wheel of an automobile and disposed to be short-circuited upon the application of the brake.

Referring now to the drawings, an engine 10 is provided to furnish power to a wheel 11 through a driving shaft 12 and thereby propel the vehicle on which the engine 10 is mounted. A clutch mechanism, within a housing 13, is provided to transmit power from the engine 10 to the driving shaft 12, when in its engaged position, and to permit the engine 10 to operate without operating the driving shaft 12, when in its disengaged position.

A fly wheel 14 is mounted in a housing 15, and a plurality of parallel conductors 16 are embedded in its peripheral surface. In the embodiment shown, the conductors 16 are permanently short-circuited through a pair of short-circuiting rings 17 and the winding carried by the fly wheel simulates the rotor winding of a squirrel-cage induction motor.

The housing 15 is provided with a number of magnetic poles 18 on its inner surface, and a field winding 19 is mounted on each of the poles 18. The field windings 19 may be energized from any suitable source of direct-current power, such as a storage battery which is ordinarily provided with automobiles. When the field windings 19 are energized, a magnetic field is set up in which the fly wheel, provided with a rotor winding, revolves.

A typical control circuit for energizing the field windings 19 at a desired time is shown in Fig. 4. It will be observed that, upon the actuation of a pedal 20, of a mechanical brake with which an automobile is ordinarily provided, an energizing circuit for the field winding 19 will be completed. When the pedal 20 is moved to the right as viewed in Fig. 4 of the drawing, a contact arm 21, disposed to be actuated by the pedal, engages a variable resistor 22, and a circuit is completed, which may be traced from a battery 23 through the field winding 19, the contact arm 21, the variable resistor 22, interlock 24, to the opposite terminal of the battery 23.

An interlock 24 is disposed to be operated by a clutch-operating lever 30 which stands in the position shown in Fig. 4 when the clutch mechanism is in its engaged position. Therefore, the energizing circuit of the field winding 19 may be interrupted by the operation of the clutch lever 30 to the disengaged position, as shown in dotted lines in Fig. 4, to cause the interlock 24 to be disengaged from one of the contact members 24'.

As will be readily understood, this method of controlling the energization of the field winding 19 provides for applying a varying amount of dynamic-braking force to assist the ordinary mechanical brakes to retard the vehicle until a low speed is reached. The dynamic-braking force may then be removed by actuating the clutch lever 30 to the disengaged position, and the vehicle finally stopped and held by the mechanical brake only.

When the engine 10 is operating to drive the wheel 11, the clutch mechanism is in its engaged position, and the fly wheel 14 is rotating with the engine 10. Should the driver of the automobile desire to retard its speed, the brake pedal 20, as shown in Fig. 4, is actuated toward the right, and the energizing circuit for the field windings 19 is completed through the entire resistor 22, so that, upon initial application of the brake pedal 20, the excitation of the field windings 19 is at its minimum. As the brake pedal 20 is moved farther to the right, the contact arm 21 is actuated to gradually reduce the amount of resistance in the energizing circuit for the field windings 19, and, when the brake pedal 20 has reached the end of its travel, the resistor 22 is eliminated from the circuit, and the maximum excitation is applied to the field windings 19.

It is well known in the art that, when a plurality of electrical conductors are moved in a magnetic field, a current is induced in them, the direction of which is such as to oppose their movement. The conductors 16, moving in the magnetic field established upon the energization of the poles 18, cut magnetic lines of force and have a current induced in them which tends to retard the rotation of the fly wheel 14. Since the energizing current for the field windings 19 is at its minimum upon the initial movement of the brake pedal 20 and is increased throughout the further movement of the brake pedal 20, the dynamic-braking effect upon the fly wheel 14 is gradually increased as the movement of the brake pedal continues. In this way, a smooth deceleration of the fly wheel 14 may be ensured until the speed of the automobile has reached a low value at which the driver may safely disengage his clutch by operation of the lever 30, thereby to interrupt the circuit supplying energy to the field winding 19 and allow the engine 10 to operate unretarded by the field established upon the energization of the poles 18.

A modification of my invention is shown in Fig. 5 in which a winding 25 is substituted for the conductors 16 and the short-circuiting ring 17. The winding 25 is embedded in the periphery of the fly wheel 14 and is so connected that there is no continuous path which currents, induced in its conductors by the residual magnetism in the poles 18, may follow, until the terminals of the winding 25 are externally short-circuited.

Slip rings 26 are provided on a shaft 27 of the fly wheel 14 and each terminal of the winding 25 is disposed to engage a corresponding slip ring. In this embodiment of the invention, a contact arm 28 is provided on the brake pedal 20 having contact members disposed to vary the amount of the resistor 22 connected in the energizing circuit for the field winding 19 and to bridge the contact members 29 and thereby establish a short-circuiting connection across the slip rings 26, each of which is connected to a terminal of the fly wheel winding 25.

Since the field winding 19 will only be energized when it is desired to retard the speed of the automobile, currents will be induced in the conductors 16 of the fly wheel 14, for a very small percentage of the operating time of the engine 10, and the heat resulting from these induced currents will not be of sufficient magnitude to be objectionable. The fly wheel 14 is of greater diameter than the brake drums which are ordinarily used on automobiles, and, therefore, provides a greater radiating surface, as well as a greater heat-storage capacity, than is provided by the ordinary brake drums, and, since heat, resulting from the induced currents in the conductors 16, exists only at a time when the brake drum would ordinarily be used, this system of braking may be advantageously employed.

Since it is possible to modify the embodiments set forth and adapt them to numerous applications without departing from the scope of the invention, it is intended that the foregoing description shall be construed as merely illustrative and not in a limiting sense.

I claim as my invention:

1. In a self-propelled vehicle having an engine, a clutch lever, a brake pedal, means for electro-dynamically braking the engine upon actuation of the brake pedal when the clutch lever is in one position, and means for preventing electro-dynamic braking when the clutch lever is in a different position.

2. In combination with an automobile, an engine having a fly wheel, a clutch actuating lever, a brake actuating lever, means for electro-dynamically braking the fly wheel upon initial operation of the brake lever and increasing said electro-dynamic braking upon further application of the brake lever, and means for preventing said electro-dynamic braking when the clutch actuating lever is in a predetermined position.

3. In combination with an automobile, an engine having a fly wheel, a clutch actuating lever, a brake actuating mechanism, a plurality of conductors mounted on the fly wheel, a field winding associated with said fly wheel, a circuit for energizing said field winding, means actuated by the brake actuating mechanism for completing said circuit, and means actuated in response to the movement of the clutch actuating lever for interrupting said energizing circuit.

4. In combination with an automobile, an engine having a fly wheel, a clutch actuating lever, a brake actuating mechanism, a plurality of conductors mounted on the fly wheel, an electric circuit for energizing said fly wheel winding, a variable resistor connected in said circuit, means actuated in response to the operation of the brake actuating mechanism for completing the circuit and decreasing its resistance, and means actuated in response to the movement of the clutch actuating lever disposed to interrupt the circuit.

In testimony whereof, I have hereunto subscribed my name this 11th day of April, 1928.

HENRY D. JAMES.